Nov. 13, 1928.
B. BERTRAM
1,691,633
FOLDING BOAT AND TRAILER THEREFOR
Filed Oct. 7, 1926   2 Sheets-Sheet 1.
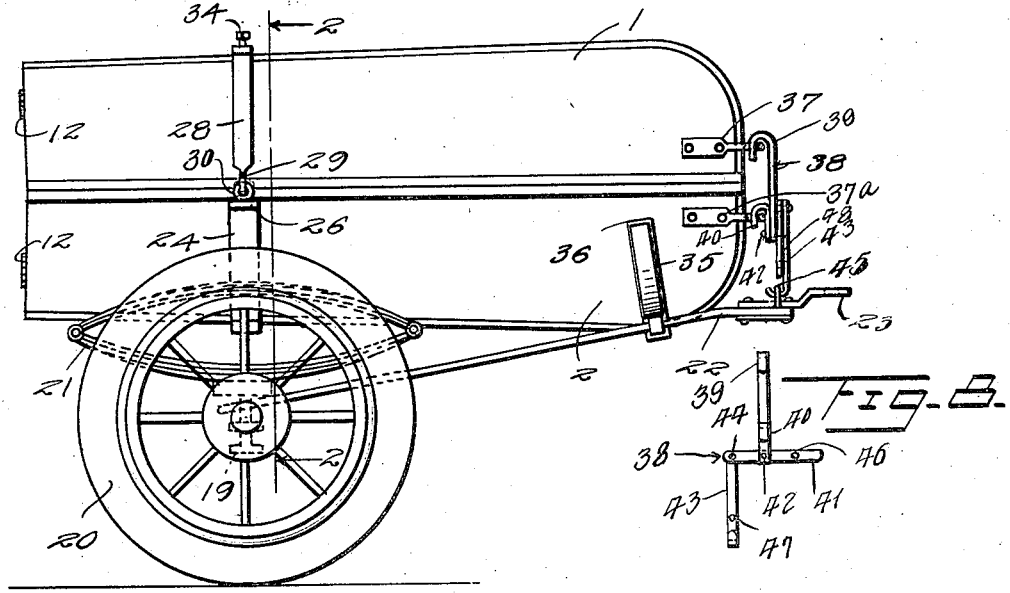
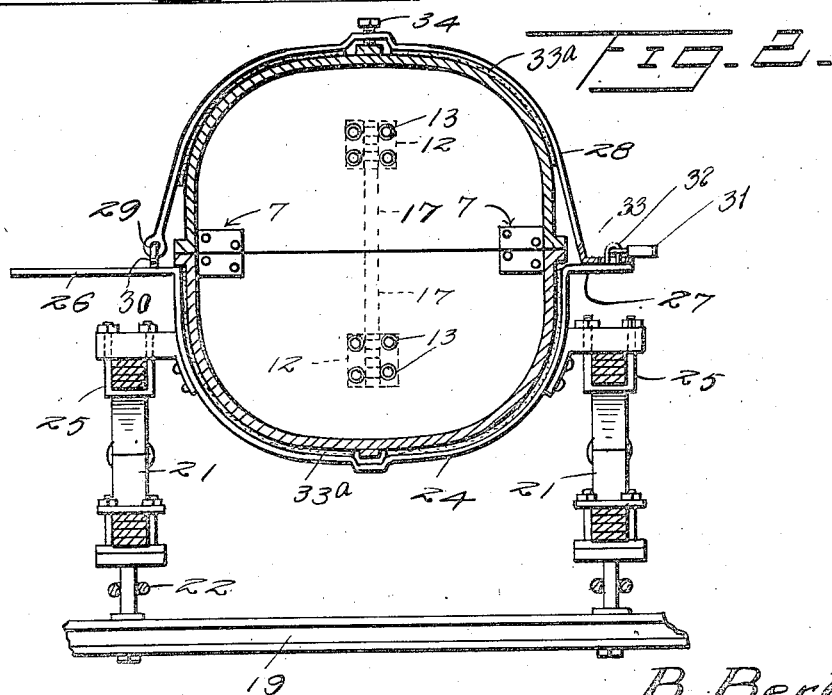
Inventor
B. Bertram
By [signature]
Attorney Nov. 13, 1928. 1,691,633
B. BERTRAM
FOLDING BOAT AND TRAILER THEREFOR
Filed Oct. 7, 1926 2 Sheets-Sheet 2
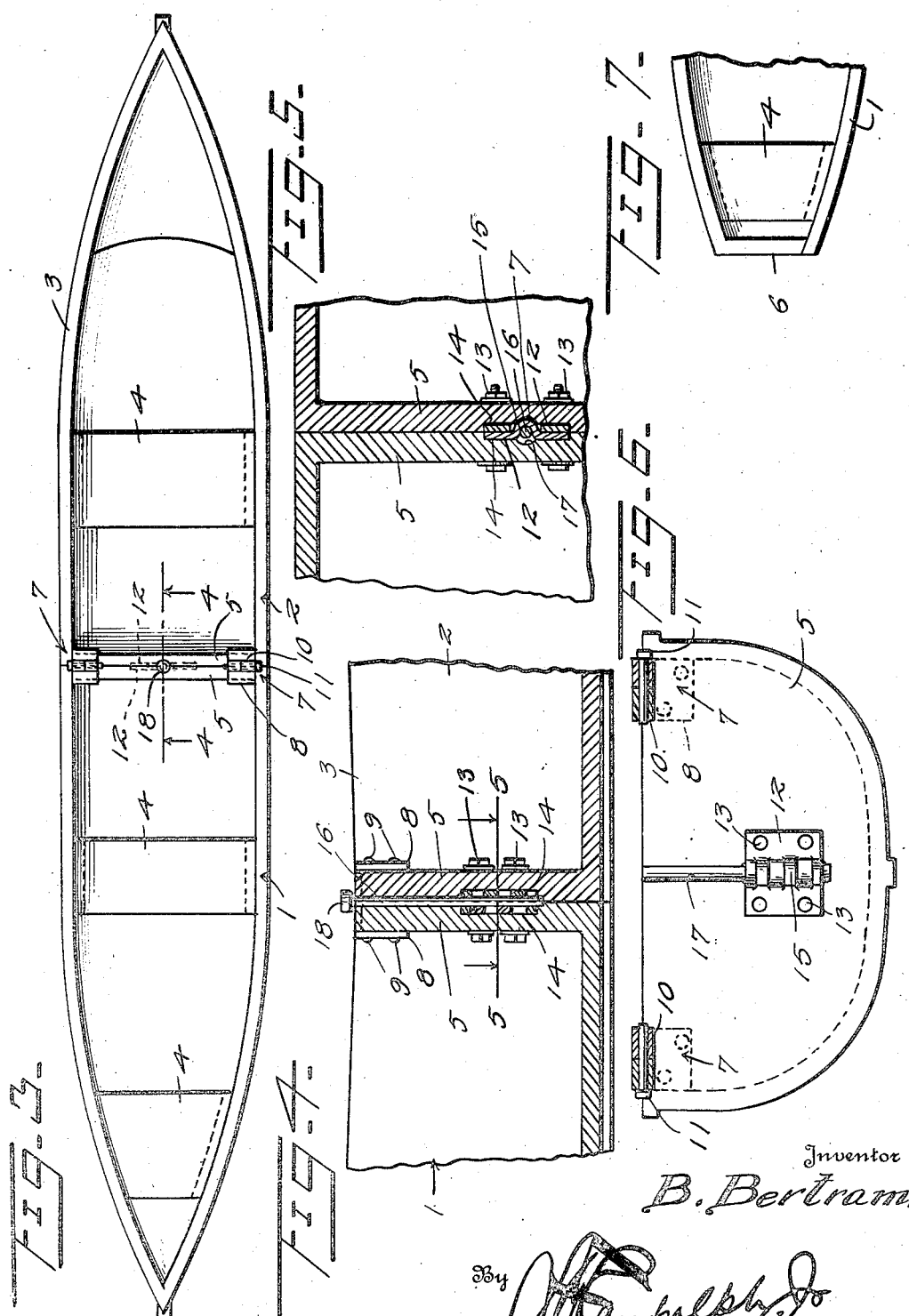
Inventor
B. Bertram,
By
Attorney Patented Nov. 13, 1928.

1,691,633

UNITED STATES PATENT OFFICE.

BELLON BERTRAM, OF SAULT STE. MARIE, MICHIGAN, ASSIGNOR OF ONE-HALF TO WALTER E. HUNTLEY, OF SAULT STE. MARIE, MICHIGAN.

FOLDING BOAT AND TRAILER THEREFOR.

Application filed October 7, 1926. Serial No. 140,115.

This invention relates to canoes, rowboats and the like, and has for one of its objects to provide a novel boat which may take the form of either of these types and which shall embody two water-tight sections pivotally connected in a manner to permit one to be folded upon the other so as to reduce the length of the boat and thus adapt it to be carried over land on an automobile trailer, the folded boat constituting a body for the trailer in which a camping outfit and other articles may be carried.

A further object of the invention is to provide a boat of this character wherein the means for pivotally connecting the sections thereof shall embody a construction adapted to permit one section to be readily disconnected from the other when it is desired to leave one section on the trailer as a container for the camping outfit and to use the other as a boat.

A further object of the invention is to provide novel and simple means for securing the sections of the boat in folded relation and to a trailer, and novel and simple means for securing the sections of the boat in extended relation.

With the foregoing and other objects in view, the nature of which will become apparent as the description proceeds, the invention consists of the construction, combination and arrangement of parts hereinafter fully described and claimed, and illustrated in the accompanying drawings, wherein:

Figure 1 an elevational view of the boat folded and mounted upon a trailer,

Figure 2 is a sectional view taken on the vertical plane indicated by the line 2—2 of Figure 1, Figure 3 is a top plan view of the boat in opened condition for use, Figure 4 is a sectional view taken on the vertical plane indicated by the line 4—4 of Figure 3, Figure 5 is a sectional view taken on the horizontal plane indicated by the line 5—5 of Figure 4, Figure 6 is an end elevation of one of the sections of the boat, Figure 7 is a slightly modified form of the stern of the boat, and Figure 8 is a detail plan view of the lever lock forming a part of the means for securing the folded boat to the trailer.

The boat comprises similar sections 1 and 2 which are pivotally connected in a manner to permit one to be folded upon the other when it is desired to reduce the length of the boat and thus adapt it to be carried over land by an automobile trailer. Each of the sections 1 and 2 is water-tight, and as shown in Figure 3 the boat is in the form of a canoe. The boat is provided with removable seats 4, and the sections 1 and 2 thereof gradually increase in depth from their adjacent or transverse ends to their remote ends. The adjacent ends of the sections 1 and 2 are closed by bulk heads 5 which carry the means by which the sections are pivotally connected and the means adapted to hold them against pivotal movement when the boat is in use. As shown in Figure 7 the stern 6 of the boat may be made square in order to permit the use of an outboard motor if desired.

The means for pivotally connecting the sections 1 and 2 consists of hinges 7. The leaves 8 of the hinges 7 are of angular formation and contact with the upper edges and inner sides of the bulk heads 5. The hinges 7 are secured to the bulk heads 5 by elements 9, and the horizontal portions of the leaves 8 thereof are recessed in the upper edges of the bulk heads. The barrels 10 of the hinges 7 are arranged in a manner to position their axes in the vertical plane passing between the bulk heads 5, and the pintles 11 of the hinges are readily removable in order to permit the sections 1 and 2 to be disconnected.

The means for preventing the sections 1 and 2 from having any pivotal movement, and thus retain them in their extended relation, consists of plates 12 which are secured by elements 13 in recesses 14 formed in the outer sides of the bulk heads 5. The plates are located adjacent the lower edges of the bulk heads 5, and are provided with interfitting loops 15 for the reception of a pin 16. The outer sides of the bulk heads 5 are provided with grooves 17 which open out through their upper edges and register with the loops 15, and are provided to permit the pin 16 to be readily inserted in and withdrawn from the loops. The upper projecting end of the pin 16 is provided with a head 18 by means of which it may be readily applied or withdrawn.

After the withdrawal of the pin 16, the sections 1 and 2 may be folded one upon the other, and the folded boat secured to the trailer in the manner illustrated in Figures 1 and 2. The trailer comprises an axle 19, wheels 20, springs 21 and a drag yoke 22. A coupling 23 is secured to the drag yoke 22 to permit the trailer to be connected to an automobile. A saddle 24 for the reception of the lower section of the folded boat, is clipped to the springs 21 as shown at 25. The saddle 24 is provided at its upper ends with laterally extending arms 26 and 27 of which the former is longer than the latter. A strap 28 which passes about the upper section of the folded boat, is pivoted at one end to arm 26 through the medium of interengaging eyes 29 and 30 of which the former is formed on the strap and the latter brazed or welded to the arm. The other or free end of the strap 28 is detachably connected to the arm 27 by a pad lock 31 which is engaged with a staple 32 brazed or welded to the arm and passes through the slot of an angular extension 33 on the strap. The saddle 24 and the strap 28 are provided with soft linings 33ª to prevent injury to the boat, and the strap is provided with a set screw 34 to prevent the boat from having any vertical movement with respect to the saddle and strap. The arm 26 is made longer than the arm 27 to provide a rest for the strap 28 when the latter is in opened boat releasing position. The drag yoke 22 is provided with a saddle 35 for the reception of the front end of the lower section of the folded boat, and this saddle has a protective lining 36. Eyes 37 and 37ª secured to the front end of the sections of the folded boat, and a lever lock 38 connected to the drag yoke 22 and said eyes, function to hold the front ends of the sections of the folded boat together and to hold the folded boat firmly in the saddle 35. The lever lock 38 comprises hooks 39 and 40 of which the former is detachably engaged with the eye 37 and the latter with the eye 37ª, a lever 41 to and between the ends of which the hooks 39 and 40 are connected by a pivot 42, and a hook 43 which is pivoted as at 44 to an end of the lever 41 and detachably engaged with a loop 45 brazed or welded to the drag yoke 22. The lever 41 is provided with an opening 46 and the hook 43 with an opening 47 to permit the use of a padlock, not shown, for the purpose of securing the lever 41 in position to retain the hooks 39, 40 and 43 in engagement with the eyes 37 and 37ª and loop 44. When it is desired to remove the lever lock 38 it is only necessary to remove the padlock and then swing the lever 41 into the position shown in Figure 8.

From the foregoing description, taken in connection with the accompanying drawings, the advantages of the construction of the boat and the means for securing it to a trailer will be readily apparent to those skilled in the art to which the invention relates. It should be understood that the drawings are merely illustrative and do not pretend to give exact proportions. Furthermore, the said drawings are illustrative of a preferred construction, it being my expectation that various changes and modifications may be made without departing from the spirit and scope of my invention.

What is claimed is:—

In combination, a trailer, a drag member therefor, a saddle carried by the trailer, a saddle carried by the drag member, a folded sectional bolt positioned in the saddles, a strap connected to said first saddle and passing about the boat, eyes carried by the boat sections and drag member forwardly beyond said second saddle, and means detachably engaged with the eyes to secure the boat sections together and hold them in said second saddle.

In testimony whereof I affix my signature.

BELLON BERTRAM.